Nov. 25, 1952        J. R. STONE        2,619,630
REGULATING APPARATUS
Filed Aug. 25, 1951
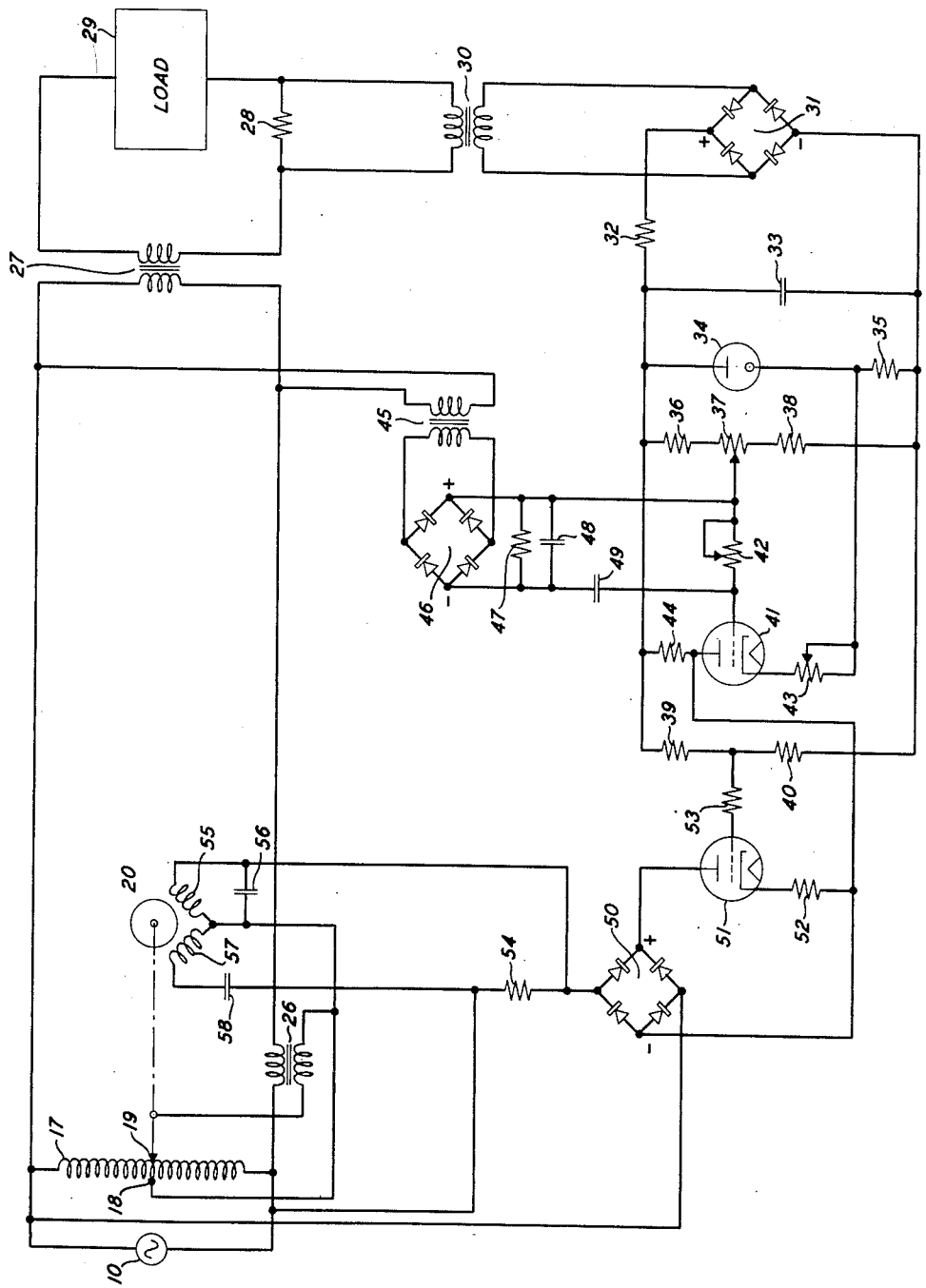
INVENTOR
J. R. STONE
BY
G. F. Heuerman
ATTORNEY Patented Nov. 25, 1952

2,619,630

UNITED STATES PATENT OFFICE 2,619,630

REGULATING APPARATUS

John R. Stone, West Orange, N. J., assignor to Bell Telephone Laboratories, Incorporated, New York, N. Y., a corporation of New York Application August 25, 1951, Serial No. 243,726

8 Claims. (Cl. 323—45)

This invention relates to regulating apparatus and particularly to apparatus for regulating the current supplied from an alternating-current supply source to a load to minimize amplitude changes of said load current.

An object of the invention is to provide improved apparatus for regulating the current supplied from an alternating-current supply source to a load.

In a specific embodiment of the invention herein shown and described for the purpose of illustration, there are provided for controlling the current supplied from an alternating-current supply source to a load circuit an auto-transformer having a fixed mid-terminal and a brush or tap driven by a two-phase motor, and a buck-boost transformer the secondary of which is connected in series with the supply source to the load circuit, the primary of the buck-boost transformer being connected to the mid-terminal and to the variable tap of the auto-transformer. One of the windings of the motor is energized directly from the auto-transformer. A bridge rectifier and a resistor in series are connected to the auto-transformer. The second winding of the motor is in a current path connecting a common terminal of the resistor and rectifier and a mid-terminal of the auto-transformer.

The space current path of a space current device is connected to the output terminals of the rectifier. There are impressed upon the second winding of the motor two component voltages which are opposed in phase, the one voltage component, across one-half of the auto-transformer, being of fixed amplitude and the other voltage component, across the resistor, varying in response to a control voltage impressed upon the control circuit of the space current device to vary the resistance of its space current path. The resultant voltage impressed upon the second motor winding may thus change in phase to control the direction of rotation of the motor and in amplitude to control the motor speed. The control voltage for the space current device is derived from the output of an amplifier upon which two component voltages are impressed. The one component has amplitude variations corresponding to load current change and the second component, for preventing hunting, is proportional to the rate of change of voltage supplied to the load circuit. The second component is derived from a sufficiently high voltage, 230 volts, for example, so that the desired effect is obtained without added amplification for the second component.

The single figure of the accompanying drawing is a schematic view of a current supply apparatus embodying the invention.

Referring to the drawing, alternating current from a supply source 10 is supplied to an auto-transformer 17 having a mid-terminal 18 and a variable tap or brush 19 driven by a two-phase motor 20. Current from the supply source 10 is supplied through the secondary of a buckboost transformer 26 to a load circuit comprising a transformer 27 the secondary of which is connected through a resistor 28 to a load 29, the primary of the buck-boost transformer 26 being connected to the output terminals of auto-transformer 17, that is, to the mid-terminal 18 and variable tap 19. The voltage supplied to the load circuit is equal to the voltage of source 10 plus or minus a voltage proportional to the output voltage of transformer 17. The voltage across resistor 28 is proportional to the current supplied to load 29.

The voltage across resistor 28 is stepped up by a transformer 30, the secondary of which is connected to the input terminals of a bridge rectifier 31. The output current of rectifier 31 is filtered by the series resistor 32 and the shunt condenser 33 to suppress ripple components thereof and the filtered current is supplied to three parallel branch paths, a first of the branch paths comprising a cold cathode, gas filled, constant voltage tube 34 in series with a resistor 35, a second branch path comprising a resistor 36, a potentiometer 37 and a resistor 38, all in series, and a third path comprising resistors 39 and 40 in series. There is provided a space current amplifier tube 41 having its control grid connected through a rheostat 42 to the variable tap of potentiometer 37 and having its cathode connected through a rheostat 43 to a common terminal of constant voltage tube 34 and resistor 35. The anode of tube 41 is connected through a resistor 44 to the positive output terminal of the rectifier and filter 31, 32, 33. There is provided a transformer 45 having a primary winding connected across the primary of transformer 27 and a secondary winding connected to the input of a bridge rectifier 46. There are connected across the output of rectifier 46 three parallel current paths a first of which comprises a resistor 47 of 0.1 megohm, for example, a second of which comprises a condenser 48 of 10 microfarads, for example, and the third of which comprises a condenser 49 of 2 microfarads and in series therewith the rheostat 42 of 0.1 megohm, for example. The voltage impressed upon the grid-cathode circuit of tube 41 has two components. The one component voltage, equal to the difference between the voltage across resistor 36 and a portion of potentiometer 37 and the relatively constant voltage across tube 34, has variations corresponding to changes of current supplied to the load. The second component voltage across rheostat 42 varies in accordance with the rate of change of voltage impressed upon the load circuit.

There is provided a bridge rectifier 50 to the output terminals of which are connected in series the space current path of a space current device 51 and a cathode resistor 52. The grid-cathode circuit of tube 51 comprises in series a resistor 53 and resistors 39, 44 and 52. The resistance of the space current path of tube 51 is thus varied in response to changes of output voltage of amplifier 41 across resistor 44. The input terminals of rectifier 50 are connected through a resistor 54 to the supply source 10. The amplitude of the alternating current flowing through resistor 54 is varied in response to resistance changes of the space current path of tube 51.

The motor 20 has a winding 55, across which a condenser 56 is connected, and a winding 57. The energizing circuit for winding 57 comprises a half portion of the winding of autotransformer 17 and condenser 58 in series. The resultant voltage impressed upon winding 55 of the motor 20 comprises two component voltages which are opposed in phase, the first component voltage being that across the lower half of auto-transformer 17 and the second component voltage being that across resistor 54. When these component voltages are of equal amplitude, no current will be supplied to motor winding 55 and no torque for causing motor rotation will be produced. The direction of rotation of the motor 20 will depend upon the phase of the resultant voltage impressed upon winding 55, the resultant voltage having one phase when the voltage across resistor 54 is the larger of the two component voltages and the resultant voltage having the opposite phase when the voltage across resistor 54 is the smaller of the two component voltages. The speed of the motor rotation is dependent on the amplitude of the resultant voltage.

If the current supplied to the load 29 decreases due to a decrease of the voltage of source 10, for example, the alternating voltage across resistor 28 and the direct voltage at the output of rectifier 31 and filter 32, 33 each decreases. The resulting voltage decrease across resistor 36 and a portion of potentiometer 37 is such as to make the control electrode of tube 41 relatively more positive or less negative with respect to its cathode. Moreover, when the alternating input voltage of rectifier 46 and its direct output voltage decrease, previously charged condenser 49 discharges through a circuit comprising rheostat 42 so that there is introduced a transient voltage component such as to make the control grid of tube 41 relatively more positive with respect to the cathode potential, the magnitude of this transient component increasing with increase of the rate of change of the voltage impressed upon rectifier 46. The transient voltage component may be adjusted by means of the rheostat 42 and the relatively steady voltage component may be adjusted by means of the potentiometer 37. The increase of space current of tube 41 flowing through resistor 44 causes the cathode of tube 51 to become more negative with respect to its control electrode, thus causing the resistance of the space current path of tube 51 to decrease. The resulting increase of alternating voltage across resistor 54 causes to be impressed upon winding 55 of motor 20 a voltage of such phase that the motor drives the brush 19 in a direction to cause the voltage across transformer 26 to boost the voltage across the load circuit, thereby increasing the current supplied to the load and increasing the voltage supplied to rectifier 46. For this condition, charging current for condenser 49 flows through rheostat 42 to make the grid of tube 41 more negative. The rate of increase of voltage across resistor 54 is thus limited to prevent the motor 20 from driving the brush 19 of the autotransformer beyond the position required for bringing the load current to a preselected amplitude. Over-shooting and hunting of the regulating system are thus prevented. As the load current increases, the resistance of the space current path of tube 51 increases until, when the normal value of load current is reached, zero voltage is impressed across motor winding 55 and the motor stops. Similarly, when the motor drives the brush 19 in a direction to decrease the voltage supplied to the load circuit, the rate of change of the voltage impressed upon motor winding 55 is limited so as to prevent a decrease of load voltage greater than that required to bring the load current to the desired normal amplitude.

The gain of amplifier 41 may be adjusted by means of the rheostat 43. As the resistance of rheostat 43 is increased, a greater change of control voltage is required to be impressed upon the grid-cathode circuit to produce a certain change of space current in tube 41. By thus adjusting the gain of the amplifier, the regulating limits of the load current may be controlled. Adjustment of the normal operating load current can be made by changing the variable tap of potentiometer 37. The effectiveness of the antihunt circuit may be adjusted by means of the rheostat 42. When the rheostat is adjusted for zero resistance, the antihunt circuit is completely ineffective. When the rheostat is set for maximum resistance, the antihunt circuit will operate at maximum effectiveness and the response of the regulator will be slower than necessary especially when the rheostat 43 is set for maximum gain.

What is claimed is:

1. The combination with means for supplying current from an alternating-current supply source to a load circuit, of means for deriving from said load circuit an alternating voltage proportional to the load current and having an amplitude less than the load voltage, a first rectifying means for rectifying said derived voltage, means for combining a portion at least of the output voltage of said first rectifying means with an opposed substantially constant voltage to obtain a unidirectional voltage smaller than said rectified output voltage and having amplitude variations corresponding to changes of output voltage of said first rectifying means, a second rectifying means for setting up a rectified output voltage larger than the output voltage of said first rectifying means and having amplitude variations corresponding to amplitude variations of said supply source, means for deriving from said second rectifying means a transient voltage proportional to the rate of change of the output voltage of said second rectifying means, a motor, and means under control of said unidirectional voltage and said transient voltage for controlling the energization of said motor.

2. In combination, an inductive winding having first and second terminals and a mid-terminal between said first and second terminals, means for supplying to said winding current from an alternating-current supply source, a two-phase motor having a first and a second winding, means for supplying current from said source to said first motor winding, a bridge rectifier having an input and an output, a resistor, a space current device having an anode, a cathode and a control electrode, a circuit comprising said inductive winding, said resistor and the input of said rectifier, a current path comprising said second motor winding connecting a common terminal of said rectifier and said resistor and said mid-terminal, a current path comprising the space current path of said space current device connected across the output terminals of said rectifier to cause space current to flow through said space current device, and means for impressing upon said control electrode with respect to said cathode a potential which may vary for controlling the energization of said second motor winding to thereby control the direction of rotation and speed of said motor.

3. In combination, a supply source of alternating current, a two-phase motor having a first and a second winding, means for supplying current from said supply source to said first winding, means for impressing upon said second winding a resultant alternating voltage having first and second voltage components of opposite phase derived from said supply source, and means for varying the amplitude of said second component with respect to the amplitude of said first component over a range including amplitudes above and below the amplitude of said first component, said last-mentioned means comprising a rectifier, a space current device having its space current path connected across the direct-current terminals of said rectifier and means for varying the resistance of said space current path.

4. A combination in accordance with claim 3 in which there is provided means controlled by said motor for controlling the voltage supplied from said supply source to a load circuit, and in which said means for varying the resistance of said space current path is under control of the voltage supplied to said load circuit.

5. A combination in accordance with claim 3 in which there are provided means controlled by said motor for controlling the current supplied from said supply source to a load, and means under control of said load current for controlling the resistance of said space current path.

6. In combination, means for supplying current from an alternating-current supply source to a load circuit including a load, means comprising a reversible motor for changing the output voltage of said supply source impressed upon said load circuit in accordance with displacement of the motor shaft, a space current device, means responsive to resistance changes of the space current path of said space current device for controlling the energization of said motor to control the displacement of the motor shaft, means for deriving from said load circuit a resultant control voltage having first and second voltage components, said first voltage component being a unidirectional voltage having amplitude variations corresponding to amplitude changes of the alternating load current, said second voltage component being a transient voltage the amplitude of which varies in response to the rate of change of voltage impressed upon said load circuit, and means responsive to said control voltage for controlling the resistance of said space current path to regulate said load current.

7. In combination, an auto-transformer supplied with current from an alternating-current supply source and having a fixed terminal and a variable tap, a reversible motor for driving said variable tap to control the output voltage of said auto-transformer measured between said fixed terminal and said variable tap, said motor having a first and a second winding, means for supplying current from said auto-transformer to said first winding, a resistor, a full-wave rectifier having input and output terminals, a space current device having a space current path, a current path including said space current path connected to said rectifier output terminals, means for supplying current from said supply source through said resistor and said rectifier to said space current path, thereby setting up an alternating voltage across said resistor, means for impressing upon a circuit including said second motor winding a voltage derived from said auto-transformer and in phase opposition thereto the voltage across said resistor, and means for controlling the resistance of the space current path of said space current device to control the amplitude of the voltage across said resistor, thereby controlling the amplitude and phase of the current supplied to said second motor winding to control the direction and speed of rotation of said motor.

8. In combination, a buck-boost transformer having a primary and a secondary, means for supplying current from an alternating-current supply source through said secondary to a load circuit including a load, an auto-transformer supplied with current from said supply source and having a fixed terminal and a variable tap, means for connecting said primary to said fixed terminal and to said variable tap to cause the voltage supplied to said load circuit to change in accordance with the displacement of said variable tap, a reversible motor for displacing said variable tap, said motor having a first and a second winding, means for supplying current from said auto-transformer to said first winding, a resistor, a full-wave rectifier having input and output terminals, a space current device having a space current path, a current path including said space current path connected to said rectifier output terminals, means for supplying current from said supply source through said resistor and said rectifier to said space current path, thereby setting up an alternating voltage across said resistor, means for impressing upon a circuit including said second motor winding a voltage derived from said auto-transformer and in phase opposition thereto the voltage across said resistor, means for deriving from said load circuit a first unidirectional voltage having an amplitude proportional to the amplitude of the alternating current supplied to the load, means for deriving from said load circuit a second unidirectional voltage having amplitude variations corresponding to amplitude changes of the alternating voltage impressed upon the load circuit, a differentiating circuit for setting up a transient voltage proportional to the rate of change of said second unidirectional voltage, means for combining said first unidirectional voltage and said transient voltage to set up a resultant voltage, and means responsive to said resultant voltage for controlling the resistance of said space current path to control the amplitude of the alternating voltage across said resistor, thereby controlling the amplitude and phase of the current supplied to said second motor winding to control the direction and speed of rotation of said motor.

JOHN R. STONE.

No references cited.